(12) United States Patent
Uchida

(10) Patent No.: US 9,978,000 B2
(45) Date of Patent: May 22, 2018

(54) INFORMATION PROCESSING DEVICE, INFORMATION PROCESSING METHOD, LIGHT-EMITTING DEVICE REGULATING APPARATUS, AND DRIVE CURRENT REGULATING METHOD

(71) Applicant: Sony Interactive Entertainment Inc., Tokyo (JP)

(72) Inventor: Masaki Uchida, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 70 days.

(21) Appl. No.: 15/351,849

(22) Filed: Nov. 15, 2016

(65) Prior Publication Data

US 2017/0154247 A1 Jun. 1, 2017

(30) Foreign Application Priority Data

Nov. 30, 2015 (JP) ................................. 2015-233669

(51) Int. Cl.
*H04N 5/228* (2006.01)
*G06K 9/62* (2006.01)
(Continued)

(52) U.S. Cl.
CPC ......... *G06K 9/6277* (2013.01); *G06K 9/4652* (2013.01); *G06K 9/623* (2013.01);
(Continued)

(58) Field of Classification Search
CPC .... G06K 9/6277; G06K 9/623; G06K 9/4652; H04N 5/2354; G06T 7/0081; G06T 7/0042
(Continued)

(56) References Cited

U.S. PATENT DOCUMENTS 7,982,708 B2 * 7/2011 Cho .................. G02F 1/133602
345/102
8,482,509 B2 * 7/2013 Choe ..................... G09G 3/342
345/102
(Continued)

FOREIGN PATENT DOCUMENTS

WO 2007050885 A2 5/2007

*Primary Examiner* — Yogesh Aggarwal
(74) *Attorney, Agent, or Firm* — Matthew B. Dernier, Esq.

(57) ABSTRACT

An information processing device includes: a captured image acquiring section that acquires data of an image captured of a target space including a light-emitting marker emitting light in a predetermined color; a score map preparing section that determines, for each of pixels making up the captured image, a score value indicative of the certainty of how likely a target object represented by an image including the pixel is emitting light in the predetermined color on the basis of a pixel value, the score map preparing section further preparing a score map associating the score values with an array of pixels on an image plane; a target region extracting section that extracts from the score map an aggregate of pixels meeting predetermined criteria as a region constituting an image of the light-emitting marker; and a position information generating section that, on the basis of the position of the extracted region, generates and outputs position information about the light-emitting marker in a real space.

15 Claims, 12 Drawing Sheets

(51) Int. Cl.
  *G06K 9/46*    (2006.01)
  *G06T 7/00*    (2017.01)
  *H04N 5/235*   (2006.01)

(52) U.S. Cl.
  CPC .......... *G06T 7/0042* (2013.01); *G06T 7/0081* (2013.01); *H04N 5/2354* (2013.01)

(58) Field of Classification Search
  USPC ...................................... 348/222.1, 370–373
  See application file for complete search history.

(56) References Cited

U.S. PATENT DOCUMENTS

| | | | |
|---|---|---|---|
| 9,495,921 B2* | 11/2016 | Fujine | H04N 5/20 |
| 2012/0057783 A1* | 3/2012 | Yamada | G06T 7/11 |
| | | | 382/165 |
| 2015/0262022 A1* | 9/2015 | Fujikawa | G06K 9/18 |
| | | | 382/141 |

* cited by examiner

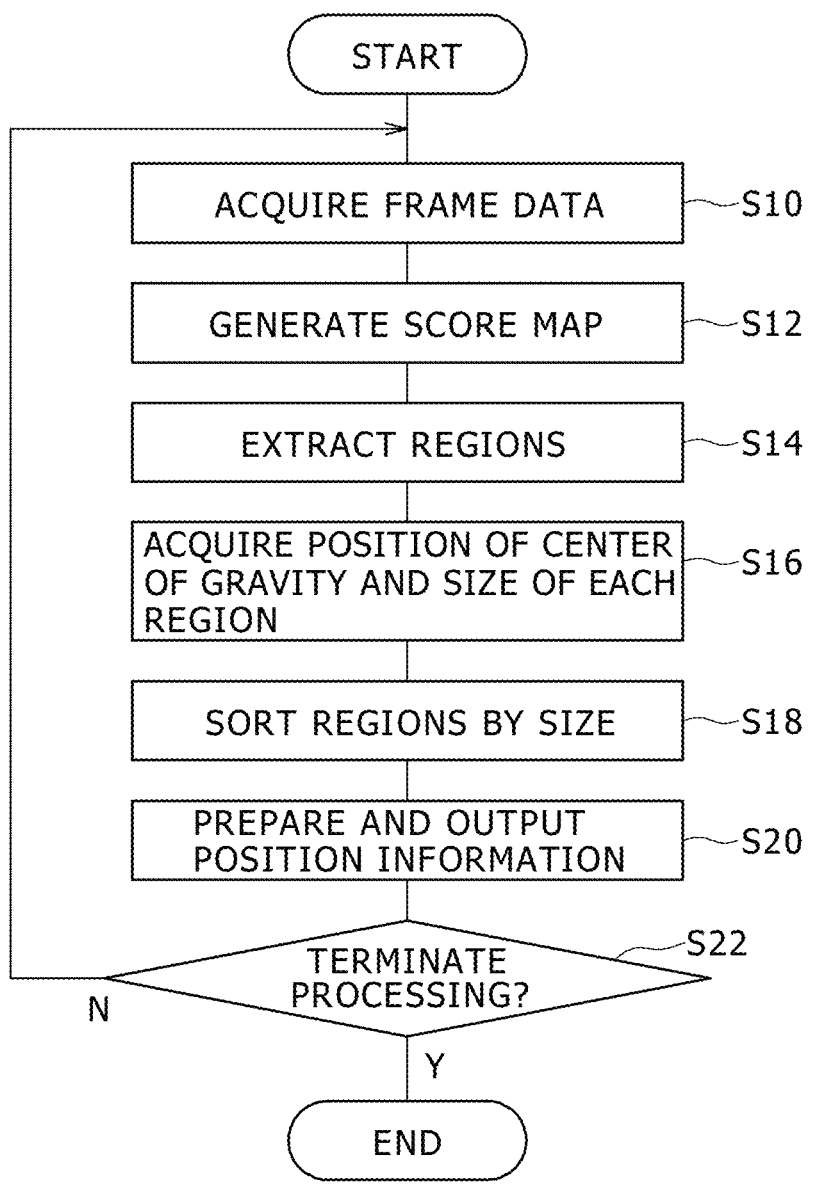

INFORMATION PROCESSING DEVICE, INFORMATION PROCESSING METHOD, LIGHT-EMITTING DEVICE REGULATING APPARATUS, AND DRIVE CURRENT REGULATING METHOD

BACKGROUND

The present disclosure relates to an information processing device and an information processing method for processing information by use of captured images.

In recent years, it has been commonly practiced to equip personal computers and game machines, among others, with a camera to capture the user's appearance with a view to using the captured image in diverse manners. Practical uses of such images include video phones and video chats. Typically, the user's image may be transmitted unmodified to the other party via a network, or subjected to image analysis so as to recognize the user's movements and use them as input information for video games or for information processing (e.g., see WO 2007/050885 A2). In particular, with the movements of a target object detected accurately in a three-dimensional space having a depth, it has been possible to provide a video game or an image representation with a sense of real presence.

SUMMARY

Where the space to be captured includes diverse objects and where the captured image is used as input data for information processing, the accuracy of processing the information is more likely to be affected by the imaging environment than if the information is processed merely through a graphical user interface (GUI) of an input device or by operation of its hardware keys. For example, the accuracy of extracting the image of an object from the captured image and, by extension, the accuracy of subsequent information processing may be influenced significantly by the colors of physical objects and the clothes worn by persons in the space to be captured, by the difference of day and night, by the number and types of illuminations involved, and by other environmental variations that may be specific to each user. This raises the need for an information processing technology solid enough to suitably deal with such diverse environmental variations even when the captured image is used as input data.

The present disclosure has been made in view of the above circumstances and it is desirable to provide an information processing technology capable of detecting the position of an object from a captured image with high accuracy.

According to one embodiment of the present disclosure, there is provided an information processing device including: a captured image acquiring section that acquires data of an image captured of a target space including a light-emitting marker emitting light in a predetermined color; a score map preparing section that determines, for each of pixels making up the captured image, a score value indicative of the certainty of how likely a target object represented by an image including the pixel is emitting light in the predetermined color on the basis of a pixel value, the score map preparing section further preparing a score map associating the score values with an array of pixels on an image plane; a target region extracting section that extracts from the score map an aggregate of pixels meeting predetermined criteria as a region constituting an image of the light-emitting marker; and a position information generating section that, on the basis of the position of the extracted region, generates and outputs position information about the light-emitting marker in a real space.

According to another embodiment of the present disclosure, there is provided an information processing method including: acquiring data of an image captured of a target space including a light-emitting marker emitting light in a predetermined color, before storing the acquired data into a memory; determining, for each of pixels making up the captured image read from the memory, a score value indicative of the certainty of how likely a target object represented by an image including the pixel is emitting light in the predetermined color on the basis of a pixel value, before preparing a score map associating the score values with an array of pixels on an image plane; extracting from the score map an aggregate of pixels meeting predetermined criteria as a region constituting an image of the light-emitting marker; and on the basis of the position of the extracted region, generating and outputting position information about the light-emitting marker in a real space.

According to a further embodiment of the present disclosure, there is provided a light-emitting device regulating apparatus including: a captured image acquiring section that acquires data of an image captured of a light-emitting device emitting light in a predetermined color; a target region extracting section that extracts, from the captured image, a region presumed to be an image of a light-emitting section of the light-emitting device in accordance with predetermined criteria; a parameter evaluating section that determines whether a parameter represented by the extracted region meets predetermined criteria; and a light-emitting device controlling section that varies a drive current of the light-emitting device until the parameter meets the predetermined criteria, the light-emitting device controlling section further setting for the light-emitting device the drive current obtained when the predetermined criteria are met.

According to an even further embodiment of the present disclosure, there is provided a drive current regulating method including: acquiring data of an image captured of a light-emitting device emitting light in a predetermined color, before storing the acquired data into a memory; extracting, from the captured image read from the memory, a region presumed to be an image of a light-emitting section of the light-emitting device in accordance with predetermined criteria; determining whether a parameter represented by the extracted region meets predetermined criteria; and varying a drive current of the light-emitting device until the parameter meets the predetermined criteria, before setting for the light-emitting device the drive current obtained when the predetermined criteria are met.

Where other combinations of the above-outlined composing elements or the above expressions of the present disclosure are converted between different forms such as a method, a device, a system, a recording medium, and a computer program, they still constitute effective embodiments of this disclosure.

According to the embodiments of the present disclosure, the accuracy of information processing involving the use of captured images is improved.

BRIEF DESCRIPTION OF THE DRAWINGS

Further objects and advantages of the present disclosure will become apparent upon a reading of the following description and appended drawings in which:

FIG. 9 is a flowchart showing steps in which a position information acquiring section of the information processing device in the embodiment typically acquires position information about the light-emitting device;

DETAILED DESCRIPTION OF THE PREFERRED EMBODIMENT

Figure 1:
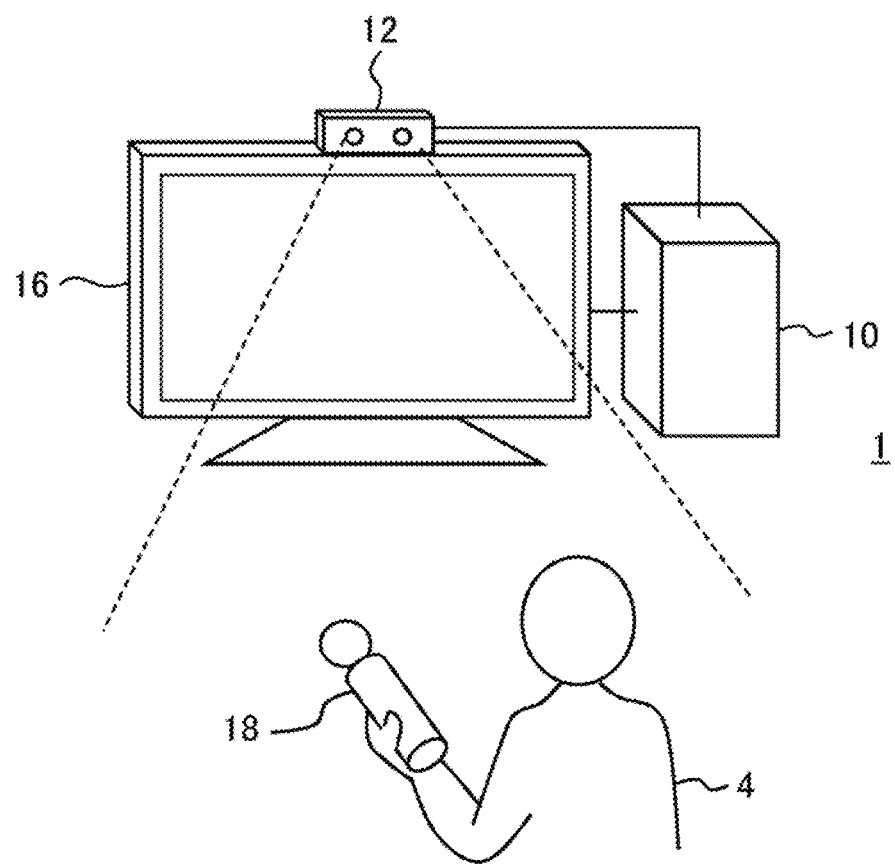
FIG. 1 is a schematic view showing a typical configuration of an information processing system as one embodiment of the present disclosure.

FIG. 1 shows a typical configuration of an information processing system 1 as one embodiment of the present disclosure. The information processing system 1 includes a light-emitting device 18 to be held by a user 4, an imaging device 12 that captures the space including the light-emitting device 18, an information processing device 10 that determines the position of the light-emitting device 18 and performs information processing accordingly, and a display device 16 that outputs the data generated as a result of the information processing.

The information processing device 10, imaging device 12, and display device 16 may be interconnected by cable or by a known wireless communication technology such as Bluetooth®. The external appearances of these devices are not limited to those shown in FIG. 1. There may be provided a device that integrates at least two of these devices. For example, the information processing device 10, imaging device 12, and display device 16 may be practiced integrally in a portable terminal. The imaging device 12 may or may not be mounted on the display device 16. Depending on what is processed by the information processing device 10, there may be a plurality of users 4 as well as a plurality of light-emitting devices 18.

The imaging device 12 has a camera that captures at a predetermined frame rate the space including the light-emitting device 18, and a mechanism that performs common processing such as a demosaicing process on an output signal from the camera to generate output data representative of the captured image and output the generated data to the information processing device 10. The camera is equipped with a common visible light sensor such as a charge-coupled device (CCD) or a complementary metal oxide semiconductor (CMOS) sensor.

As shown in FIG. 1, there may be provided a stereo camera having a pair of the above-described cameras arrayed right and left and positioned a known distance apart. The stereo camera determines the position of the target object such as the light-emitting device 18 including its distance from the imaging plane of the camera in a three-dimensional space. Alternatively, the imaging device 12 may be a monocular camera. Also, the imaging device 12 may output a so-called raw image acquired by the visible light sensor and constituted typically by a Bayer array. The raw image output unmodified by the imaging device 12 may be subjected to necessary processing such as the demosaicing process by the information processing device 10.

The information processing device 10 determines the position of the light-emitting device 18 in the real space using the data sent from the imaging device 12. On the basis of the position information, the information processing device 10 performs necessary information processing to generate output data such as images and sounds representing the result of the processing. The specifics of the processing performed by the information processing device 10 using the position information about the light-emitting device 18 are not limited in any way. The content of the processing may be determined as needed depending on the functionality desired by the user 4 or on the content of the application in use. For example, the information processing device 10 acquires the movements of the user 4 from those of the light-emitting device 18 in order to advance a video game in which a character doing similar movements appears, or so as to convert the movements of the light-emitting device 18 into an input command to execute a corresponding function.

The display device 16 may be a television (TV) set equipped with a display unit configured to output display images and with speakers for outputting sounds. Typical display devices include a liquid crystal display TV set, an organic electroluminescence (EL) TV set, a plasma TV set, and a personal computer (PC) display. The display device 16 may also be a display-and-speaker arrangement of a tablet terminal or a mobile terminal. Further, the display device 16 may be either a flat display device such as is shown in FIG. 1 or a head mount display device showing images in front of the user 4's eyes when worn by the user 4 on the head, or both.

The information processing device 10 may further include an input device operated by the user 4 to receive input requests and commands for starting and ending processing and for selecting functions, the input device supplying the received requests and commands to the information processing device 10 as electric signals. The input device may be a particular device such as a controller equipped with hardware keys, a mouse, or a joystick. The input device may also be a touch pad covering the display surface of the display device 16.

Figure 2:
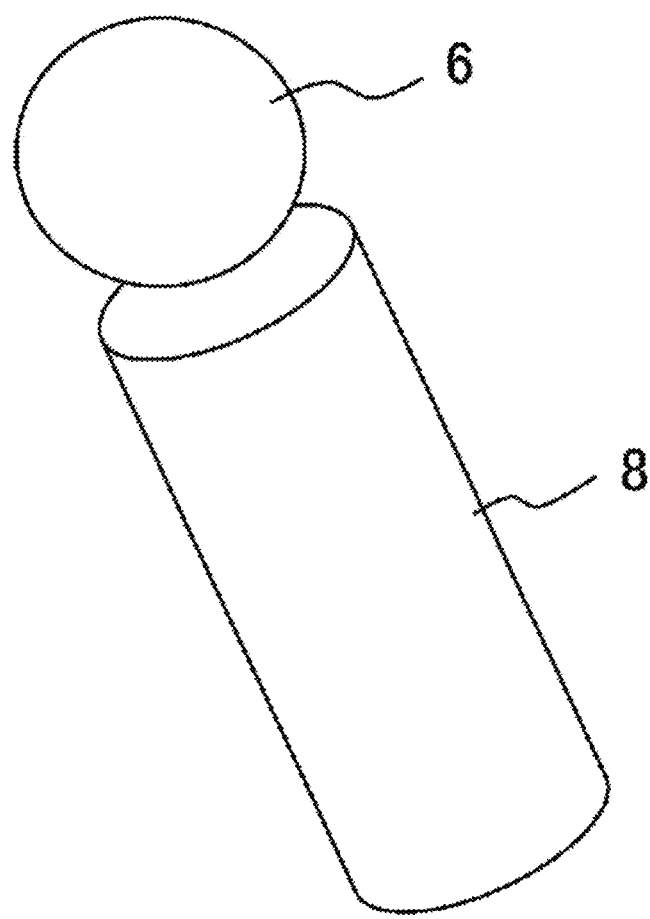
FIG. 2 is a schematic view showing an external appearance of a light-emitting device in the embodiment.

FIG. 2 shows a typical external appearance of the light-emitting device 18. The light-emitting device 18 includes a light-emitting section 6 and a handgrip 8. The light-emitting section 6 is a spherical body that incorporates a common light source such as a light-emitting diode or an electric bulb and is formed by a cover material such as a transparent plastic resin. When turned on to illuminate, the light-emitting device 18 emits light from the entire spherical body.

Where a plurality of users 4 individually hold light-emitting devices 18, the light-emitting devices 18 are caused to emit light in different colors so as to be recognized individually.

The handgrip 8 is a part that is held by the user 4's hand and may have input buttons such as ON/OFF buttons, not shown, as needed. The handgrip 8 may also have a communication mechanism for establishing communication with the information processing device 10 in wired or wireless fashion and for exchanging necessary information therewith. For example, the information processing device 10 may assign luminescent colors individually to a plurality of light-emitting devices 18, notify the light-emitting devices 18 of the assigned luminescent colors, and control how the light-emitting devices 18 are to light or blink.

Furthermore, the handgrip 8 may incorporate a motion sensor such as an acceleration sensor or a gyro sensor. The measurements taken by the sensor may be transmitted from the light-emitting device 18 to the information processing device 10 at a predetermined rate. This allows the information processing device 10 to determine continuously the posture of the light-emitting device 18. The external appearance of the light-emitting device 18 is not limited to what is shown in FIG. 2. Alternatively, the light-emitting device 18 may be configured to be attached to the user 4's body or formed integrally with the above-mentioned head mount display device or input device. For example, a suitably shaped light-emitting region may be provided on the surface of the head mount display device or input device. There may be one or multiple such light-emitting regions.

This embodiment extracts an image of the light-emitting section 6 with high accuracy from the image captured of the space where there exist diverse objects, and determines the position of the light-emitting device 18 based on the position and size of the light-emitting section 6. More specifically, the embodiment evaluates pixel values against the criteria of how likely the light-emitting section 6 has a predetermined color and how likely the light-emitting section 6 is emitting light. The criteria are intended to ensure the distinction from some other object that has the same color as the light-emitting section 6 but is not being lit or from an object that is being lit but does not have the same color, so that the image of the light-emitting section 6 alone is extracted with high accuracy. In the case of the light-emitting device 18 such as is shown in FIG. 2, an approximately circular region of the image captured of the light-emitting section 6 is extracted. Where the luminescent color is known in advance, the light source may be the input device or the head mount display device. In the ensuing description, the luminous body such as the light-emitting section 6 represented by the image of the extracted object will be generically referred to as "the light-emitting marker."

Figure 3:
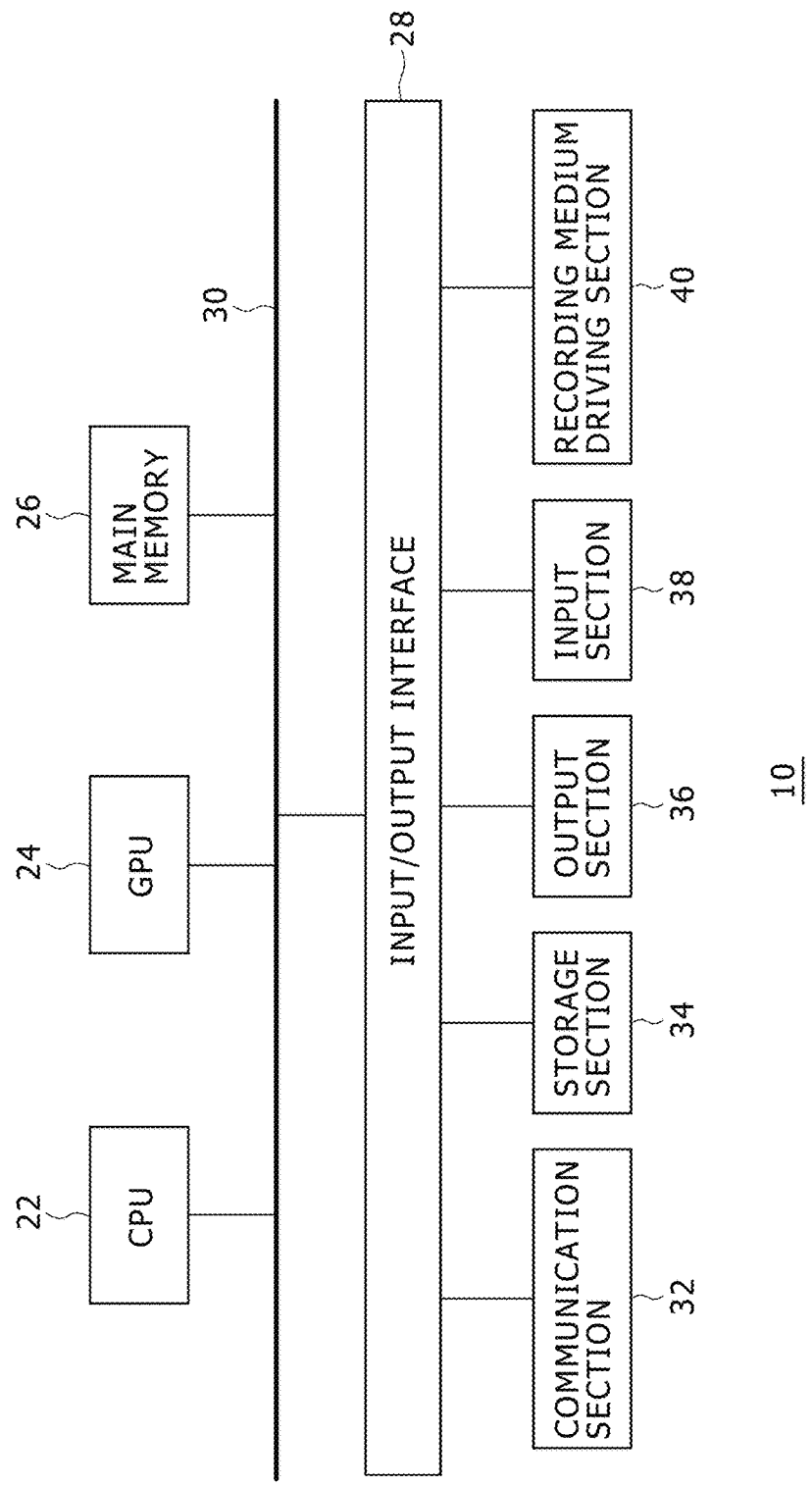
FIG. 3 is a block diagram showing an internal circuit configuration of an information processing device in the embodiment.

FIG. 3 shows an internal circuit configuration of the information processing device 10. The information processing device 10 includes a central processing unit (CPU) 22, a graphics processing unit (GPU) 24, and a main memory 26. These components are interconnected via a bus 30. The bus 30 is further connected with an input/output interface 28. The input/output interface 28 is connected with a communication section 32 formed by a peripheral interface such as a universal serial bus (USB) or IEEE 1394 (stipulated by the Institute of Electrical and Electronics Engineers, Inc.) or by a network interface of a wired or wireless local area network (LAN), a storage section 34 such as a hard disk drive or a nonvolatile memory, an output section 36 that outputs data to the display device 16, an input section 38 that inputs data from the imaging device 12 and the input device, and a recording medium driving section 40 that drives a removable recording medium such as a magnetic disk, an optical disc, or a semiconductor memory.

The CPU 22 controls the entire information processing device 10 by executing an operating system stored in the storage section 34. The CPU 22 also executes programs read from the removable recording medium and loaded into the main memory 26 or programs downloaded via the communication section 32. The GPU 24 has the functions of a geometry engine and a rendering processor. The GPU 24 performs a rendering process in accordance with rendering instructions from the CPU 22 and stores the resulting display image into a frame buffer, not shown. The display image stored in the frame buffer is converted to a video signal before being output to the output section 36. The main memory 26 includes a random access memory (RAM) that stores the programs and data necessary for processing.

Figure 4:
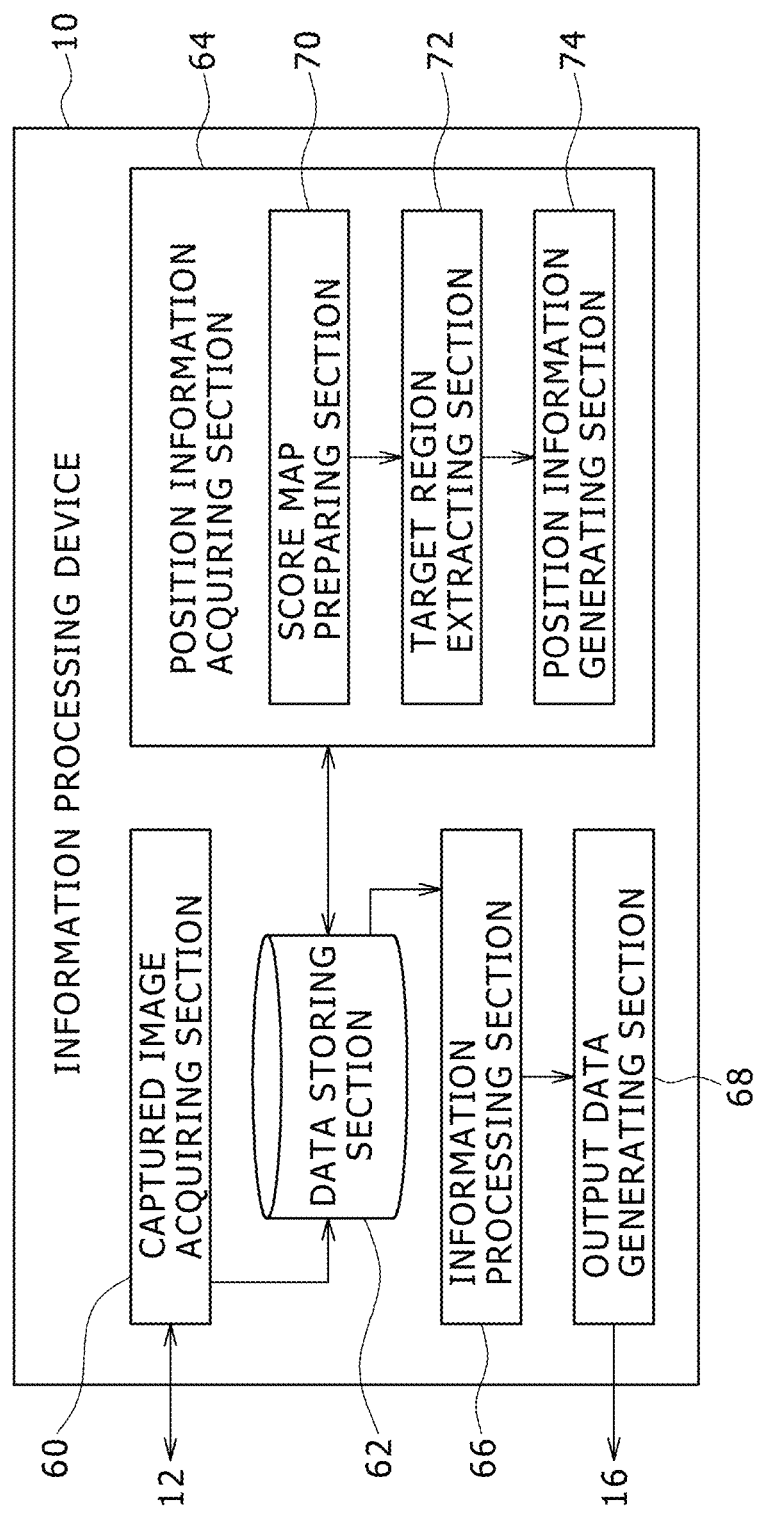
FIG. 4 is a block diagram showing a functional block configuration of the information processing device in the embodiment.

(1) Information Processing Based on the Position Information about the Light-emitting Marker Explained below is how an image of the light-emitting marker is detected from the captured image in the operational phase of the above-described configuration and how information processing is carried out on the basis of the position information about the light-emitting marker. FIG. 4 shows a functional block configuration of the information processing device 10 in the embodiment. The information processing device 10 includes a captured image acquiring section 60 that acquires captured image data from the imaging device 12, a data storing section 62 that stores the data representative of the captured image and position information, a position information acquiring section 64 that detects an image of the light-emitting marker from the captured image to acquire the position information about the marker in the real space, an information processing section 66 that performs predetermined information processing based on the position information, and an output data generating section 68 that generates data to be output as a result of the information processing.

The components indicated in FIG. 4 and in FIG. 11, to be discussed later, as functional blocks that perform diverse processes may be formed in hardware terms by such major circuits as the CPU 22, GPU 24, and main memory 26 in FIG. 3, or constituted in software terms by the programs loaded into the main memory 26 from the recording medium driven by the recording medium driving section 40 or from the storage section 34. It will be appreciated by those skilled in the art that these functional blocks are implemented by hardware alone, by software alone, or by a combination of hardware and software and are not to be limited to any of them.

The captured image acquiring section 60 acquires successively the frame data of a video captured by the imaging device 12 and stores the acquired frame data into the data storing section 62. The frame data acquired here may be either red-green-blue (RGB) image data or Y-axis-luminance-chroma-blue-chroma-red (YCbCr) image data depending on the internal circuit configuration of the imaging device 12. Where the frame image has not undergone the demosaicing process or shading compensation, the captured image acquiring section 60 performs the process or compensation on the data before storing the data into the data storing section 62.

As an initial procedure, the captured image acquiring section 60 may analyze the captured image to determine an optimal imaging condition, and put the imaging device 12 under feedback control to capture images under that optimal condition. For example, if the major emphasis is on extracting the image of the light-emitting marker with high accuracy, the exposure for the marker image is made less than that for ordinary images to be captured for display purposes. This accentuates the difference in image luminance between light-emitting objects and other objects, thereby enhancing the accuracy of extracting the light-emitting marker image.

The position information acquiring section 64 successively reads the frame data of the captured image from the data storing section 62 to extract the image of the light-emitting marker. On the basis of the marker image thus extracted, the position information acquiring section 64 acquires the position information about the light-emitting device 18 in the real space. The position information acquiring section 64 includes a score map preparing section 70, a target region extracting section 72, and a position information generating section 74. On the basis of the color information represented by the pixels of each frame image, the score map preparing section 70 obtains for each pixel a score value indicative of the probability of how likely the target object as the origin of the image is emitting light in a predetermined color. The score map preparing section 70 proceeds to prepare a score map representing the score values thus obtained on an image plane.

That is, given the color of the captured image, the probability of how likely the object originating the color is emitting light in the predetermined color is expressed as a score value. The score value here is the sum of the certainty of how likely the object has the predetermined color and of the likelihood of how likely the object is emitting light. This embodiment uses suitable calculation formulas, to be discussed later using an example, capable of individually identifying light-emitting markers of different colors such as blue, red, and green. The use of the calculation formulas distinguishes the different light-emitting markers of the same shape from each other and allows them to be recognized individually for information processing. In the ensuing description, the luminescent color of each marker to be extracted will be referred to as "the target color."

The target region extracting section 72 extracts the region of an image of the object emitting light in the target color, by searching through the score map to identify an aggregate of continuous pixels having higher score values than the surroundings. If there are a plurality of such pixel aggregates, as many regions as the number of the aggregates are extracted. If the aggregates of pixels have a different luminescent color each, individual regions are extracted in association with the different luminescent colors. The target region extracting section 72 further evaluates the extracted regions by size and excludes those regions found less likely to be the images of the light-emitting markers.

For example, in the user's vicinity, there are numerous electronic appliances with light-emitting indicators giving certain information such as power-on/off by means of their luminescent colors or when they are lit up or turned off. These light-emitting indicators are likely to have shapes and luminescent colors similar to those of the light-emitting markers whose positions are to be detected by the embodiment. On the other hand, such ambient light-emitting indicators generally have diameters as small as several millimeters. It follows that if the size of the light-emitting marker is suitably selected, i.e., if the light-emitting marker is designed to give a sufficiently large image that is apparently larger than common light-emitting indicators even when the marker is positioned farthest in a presumed movable range, the marker is distinguishable by its image size.

The extracted regions are thus subjected to a lower limit in size. Those regions smaller than the lower limit are excluded so that faulty detection of a region will be prevented. This process is useful in excluding not only the light-emitting indicators but also false colors likely to occur in the demosaicing process. Where the size of the light-emitting marker is known in advance, the upper limit in size for the light-emitting marker is approximately defined accordingly. The extracted regions may thus be subjected to the predetermined upper limit in size; the regions larger than the upper limit may then be excluded.

The position information generating section 74 determines the position of the light-emitting marker and, by extension, the position of the light-emitting device 18 in the real space on the basis of the position coordinates of the center of gravity and the size of each region extracted from the captured image as the image of the light-emitting marker. Where the imaging device 12 is a stereo camera, the score map preparing section 70 and the target region extracting section 72 perform the above-described processes on each of the stereo images captured from the right and left points of view. This allows the position of the center of gravity of each region representing the light-emitting marker image to be obtained. The position information generating section 74 regards as a parallax the difference in terms of the center of gravity between the stereo images in the horizontal direction, and acquires the depth distance of the light-emitting marker using the common principles of triangulation.

As with the light-emitting section 6 shown in FIG. 2, if the light-emitting marker has a constant apparent size regardless of its captured angle or if there are a plurality of light-emitting markers arrayed a predetermined distance apart on the device surface, a monocular camera can acquire the depth distance of each light-emitting marker using the sizes of, and the distance between, the images. The position information generating section 74 converts the position information into data by typically preparing a so-called depth map in which the depth distance of the light-emitting marker thus determined relative to the imaging plane of the camera is represented by the pixel values of the region indicative of the light-emitting marker image in the frame image. The position information thus converted to the data is stored into the data storing section 62. If there are a plurality of light-emitting markers with different colors, the position information is generated for each of the colors on the basis of the center of gravity, for example, of the image extracted for each color.

The information processing section 66 reads the position information about the light-emitting marker from the data storing section 62 and performs information processing on the position information accordingly. As mentioned above, the specifics of the information processing carried out in this case are not limited. The output data generating section 68 generates the image data to be displayed and the sound data to be output as a result of the information processing performed by the information processing section 66, and outputs the generated data successively to the display device 16.

The principles for the score map preparing section 70 to prepare the score map are explained below. As discussed above, this embodiment quantifies for each pixel the probability of how likely the target object is emitting light in a predetermined color on the basis of the color information about the pixels making up the frame image. Specifically, the product of the certainty of how likely the object represented by the image including the pixel of interest has the predetermined color, and of the likelihood of how likely that object is emitting light, is calculated. The probability of an aggregate of these products is then calculated. In this case, hue is used to determine the color-related certainty, and saturation is used to determine the light-related likelihood.

Figure 5:
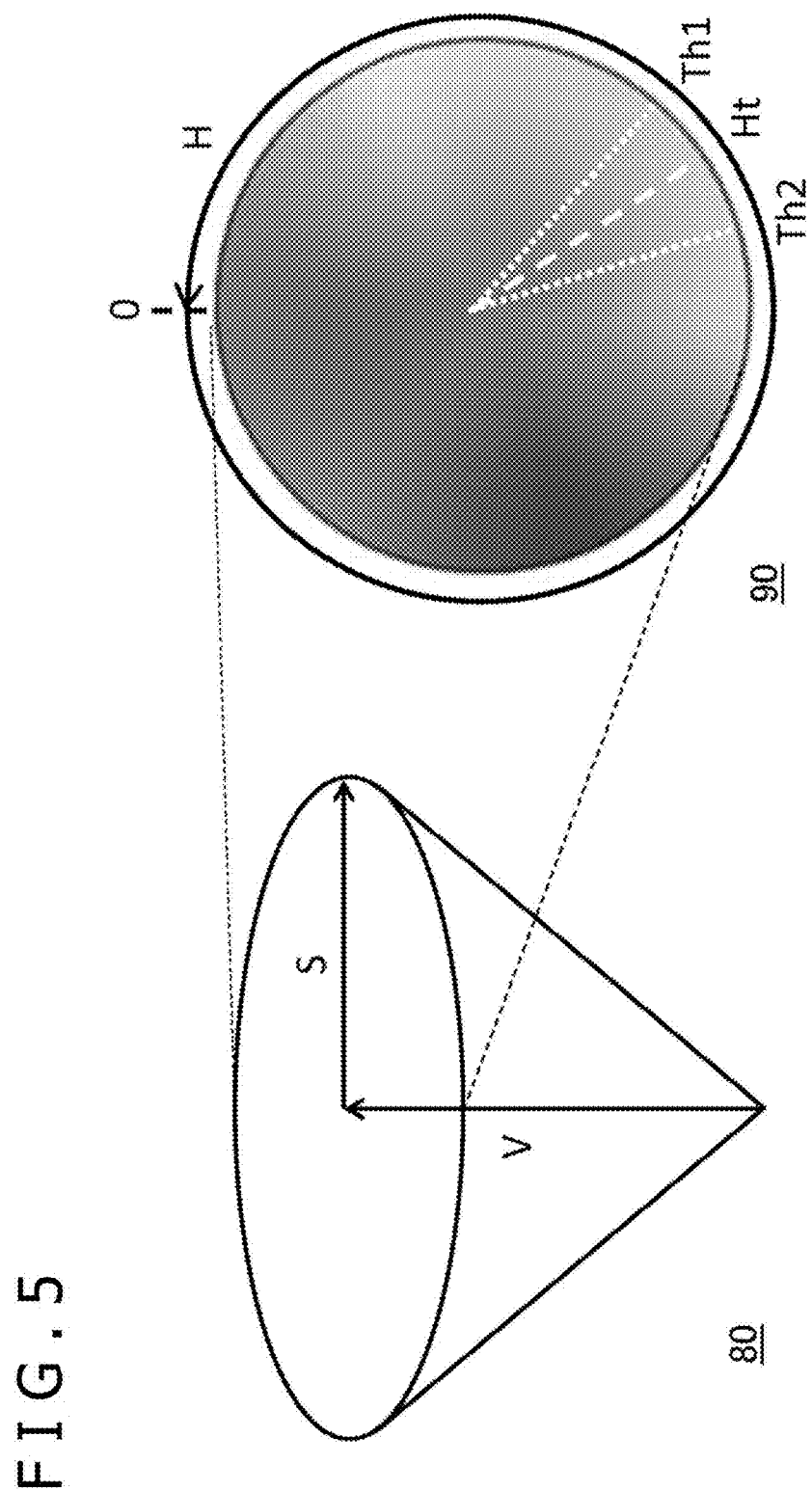
FIG. 5 is a schematic view showing a hue-saturation-value (HSV) color space of a cone for use in calculating score values with the embodiment.

FIG. 5 shows the HSV color space of a cone for use in calculating score values with the embodiment. Shown on the left in FIG. 5 is a cone 80 representative of the color space. A horizontal cross-section of the cone 80 centering on its axis, shown on the right in FIG. 5, constitutes a hue circle 90 representing hues H in circular fashion. It should be noted that the actual hue circle is a 360-degree circular representation of a color spectrum of which the angle expresses the hue H. In the horizontal cross-section, the distance from its center stands for saturation S. The axial distance from the apex of the cone 80 to the cross-section denotes brightness value V. The hue H and the saturation S for use with this embodiment are obtained by the following mathematical formula based on the RGB values represented by each pixel:

$$\tan H = \frac{\sqrt{3}(G-B)}{2R-G-B}$$ [Math. 1]

$$S = \text{Max}(R, G, B) - \text{Min}(R, G, B)$$

From the RGB values of each pixel, the score map preparing section 70 obtains the hue H and saturation S. Where the frame data obtained from the imaging device 12 constitutes a YCbCr image, a known conversion equation is used to find the hue H and saturation S. The certainty C(H) of how likely the object has the target color is determined on the basis of the value of hue H, and the likelihood L(S) of how likely the object is emitting light is determined using the value of saturation S, with regard to each pixel.

In order to calculate the certainty C(H), a hue Ht corresponding to the target color is set to be sandwiched by threshold values Th1 and Th2 (Th1<Ht<Th2). For example, if the target color is blue, a range of hues from Th1 to Th2 within which the luminescent color of the light-emitting marker is presumed to be blue is set for the hue Ht corresponding to the color blue. The hue range is provided to tolerate variations of the image color in the imaging environment. The hue range is set for each of the target colors involved.

Figure 6:
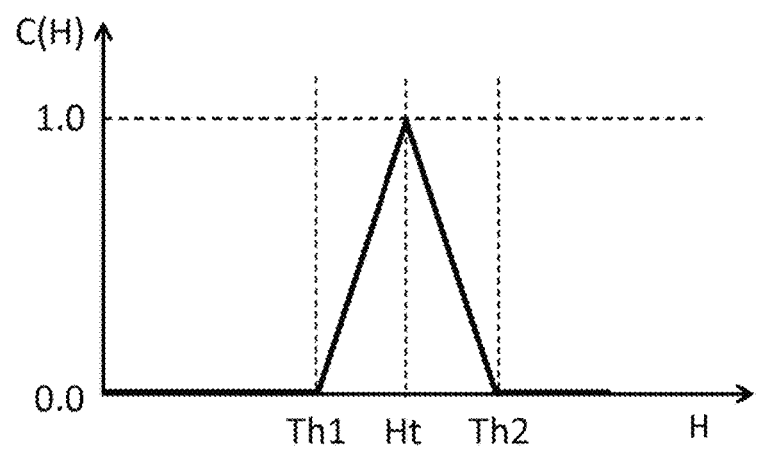
FIG. 6 is a graphic representation showing typical settings of hue-based certainty C(H) of how likely the object has a target color with the embodiment.

FIG. 6 shows typical settings of hue-based certainty C(H) of how likely the object has a target color. In this example, the certainty C(H) is a function that is 0 when the hue H is outside the hue range corresponding to the target color, the function varying conspicuously away from 0 as illustrated when the hue H is within the hue range. That is, the certainty C(H) with regard to hue H is obtained as follows:

$C(H)=0$ when $H \leq Th1$ $C(H)=(H-Th1)/(Ht-Th1)$ when $Th1 < H \leq Ht$ $C(H)=(Th2-H)/(Th2-Ht)$ when $Ht < H \leq Th2$ $C(H)=0$ when $Th2 < H$ In this example, the certainty C(H) is a function that is maximized when the hue of the pixel matches the target color, becomes smaller the farther the hue is from the target color, and is 0 when the hue reaches the threshold value Th1 or Th2. The varying function allows the target color to be distinguished from other colors while providing a certain acceptable range for the hue of the color represented by each pixel. Also, the variations of hue within the acceptable range can be reflected in the certainty C(H). When the certainty C(H) is allowed to vary continuously in and out of the acceptable range, it is possible to reduce the instability of the extracted region attributable to a small pixel value error getting amplified as the certainty C(H).

In the above example, the certainty C(H) is a function that is maximized when the target color has the hue Ht and varies linearly within the range of Th1<H≤Th2. However, this is not limitative of the present disclosure. Alternatively, the function may be a curve including at least two terms. When the threshold values Th1 and Th2 are set, the settings are suitably determined by statistically processing the image hues of the same light-emitting marker in the images captured in diverse circumstances, for example. In such a case, the threshold values Th1 and Th2 may be fixed for all circumstances. Alternatively, all images captured during operation may be analyzed to find such characteristics as luminance, frequency, and color distribution so that the threshold settings may be switched accordingly.

Meanwhile, the likelihood L(S) of how likely the object is emitting light is represented by a function that increases monotonically in proportion to the increase in saturation S. For example, the function may be L(S)=S. The saturation S in the HSV color space of the cone model expressed by the above formula takes a larger value the higher the purity of the color and the higher its intensity. Thus the saturation S may be used unmodified as a likelihood value reflecting the emission intensity. Alternatively, there may be a curvilinear variation involving at least two terms. As another alternative, the likelihood L(S) may be set to 0 for the saturation S lower than a predetermined threshold value, as in the case of the certainty C(H).

The certainty C(H) and likelihood L(S) obtained as described above are used to calculate the score value S indicative of the probability of how likely a given pixel represents an image of the light-emitting marker emitting light in the target color. Typically, the calculations are made as follows:

$$S = C(H) \times L(S)$$

Alternatively, the following score value S may be defined using the function shown in FIG. 6 as a weighting factor a(H) for the hue H:

$$S = \alpha(H) \times H \times L(S)$$

The score map preparing section 70 calculates the score value for each pixel and has the calculated score values mapped on an image plane to prepare a score map.

Figure 7:
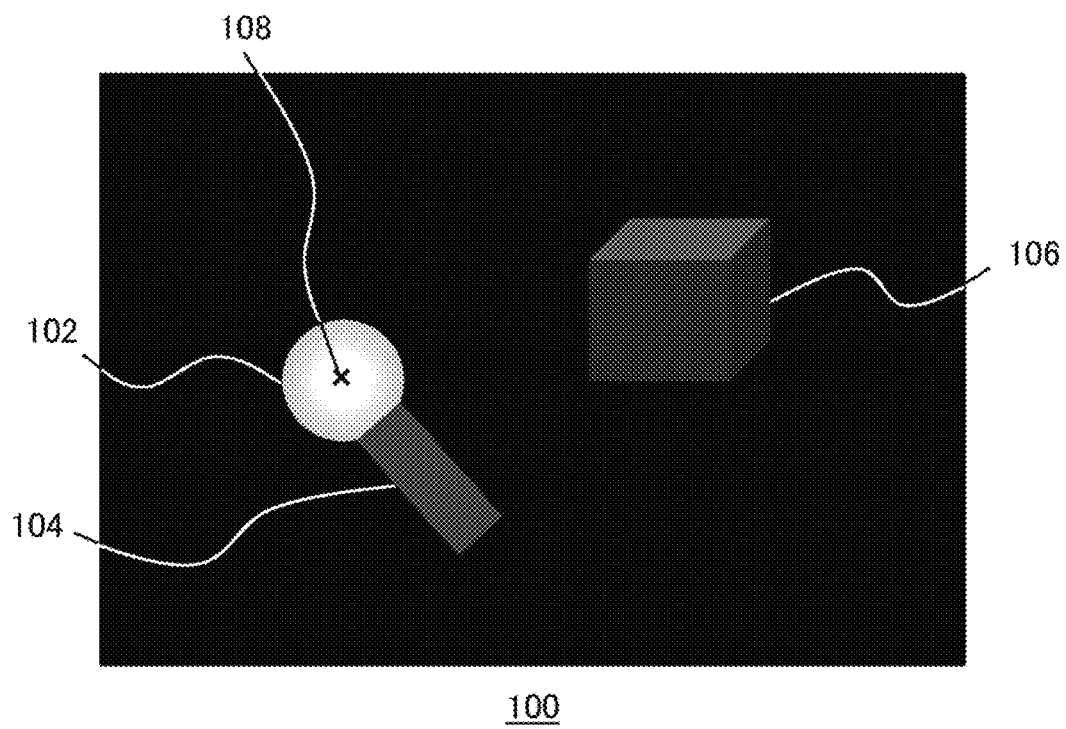
FIG. 7 is a schematic view showing a typical score map for the embodiment.

FIG. 7 schematically shows a typical score map 100. In FIG. 7, the score map 100 is represented as a gray scale image of which the luminance is higher the larger the score value. Because the certainty C(H) shown in FIG. 6 is used, the greater part of the map having a hue outside the presumed acceptable hue range of the target color is given the score value of 0. Also with the likelihood L(S) in use, small score values are given to regions 104 and 106 representing objects of which the hues fall in the acceptable range but which are not emitting light. As a result of this, a prominently large score value is given to a region 102 representing the object of which the hue falls in the acceptable range and which is emitting light.

Suppose that the regions 102 and 104 represent images of the light-emitting device 18. In that case, even if the luminescent color of the light-emitting section 6 is the same as the color of the handgrip 8, their images are distinguished from each other because of the difference between their score values. If the spherical part has an uneven distribution of light intensity levels, the score values take on some variations reflecting the distribution. When the score map preparing section 70 has prepared the score map as illustrated for each of the frames making up the captured image, the target region extracting section 72 searches through the score maps to extract the region 102 therefrom.

For example, the target region extracting section 72 scans the score map pixels in order of raster scan to extract the pixel whose score value is maximized. The maximal value to be extracted may be subject to a lower limit. Alternatively, the target region extracting section 72 may extract the pixel of which the score value is maximally different from the largest of the score values for the entire image within the acceptable range. Starting from the extracted pixel, the target region extracting section 72 may search through the surrounding pixels to extract an aggregate of continuous pixels whose score values have variations falling within the predetermined range. In this manner, the region 102 alone can be extracted in the example of FIG. 7.

Using known techniques, the target region extracting section 72 obtains the position coordinates of the center of gravity 108 of the region 102 thus extracted. Where stereo images are used, the actual distance to the light-emitting marker is obtained on the basis of the difference between the centers of gravity of the two captured images. Where an image captured by a monocular camera is used, the actual distance to the light-emitting marker is acquired by use of the center of gravity and the size of the region 102 such as its area and diameter. Where a plurality of light-emitting markers having different luminescent colors are used, a score map is prepared for each of the luminescent colors regarded as the target color. From the score maps thus prepared, the regions having high score values are extracted as described above. There may be various procedures for efficiently extracting continuous regions each having high pixel values. Any of these procedures may be adopted for the extraction.

Figure 8A:
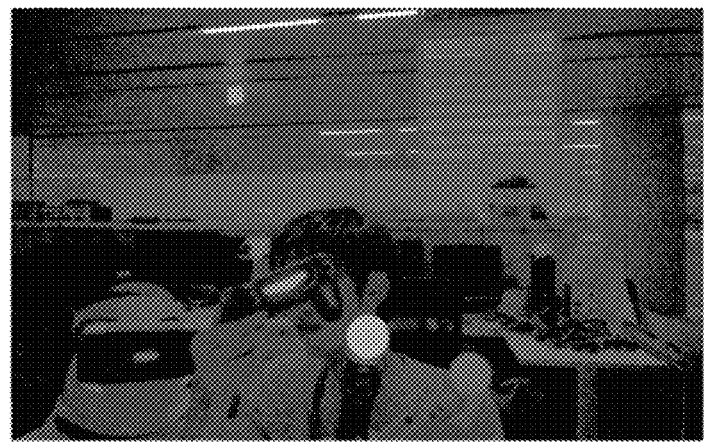
FIGS. 8A, 8B, and 8C are views showing how target regions are typically extracted from actual captured images with the embodiment.
Figure 8B:
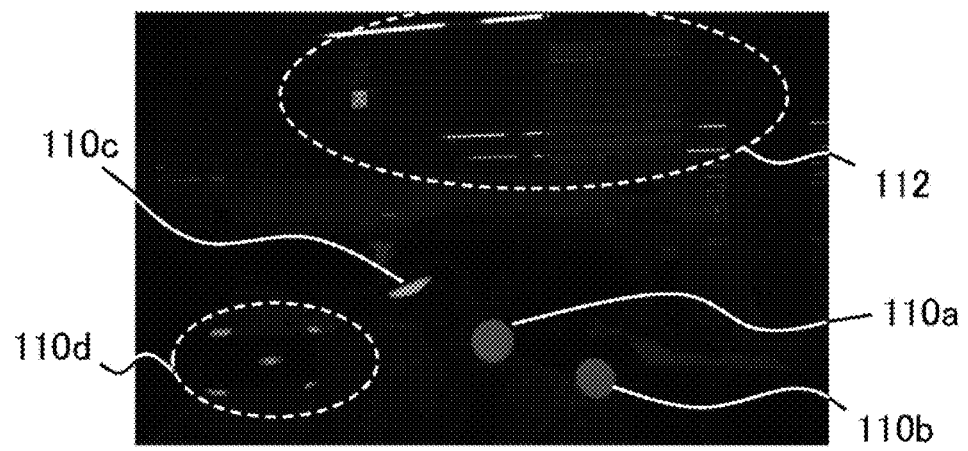
Figure 8C:
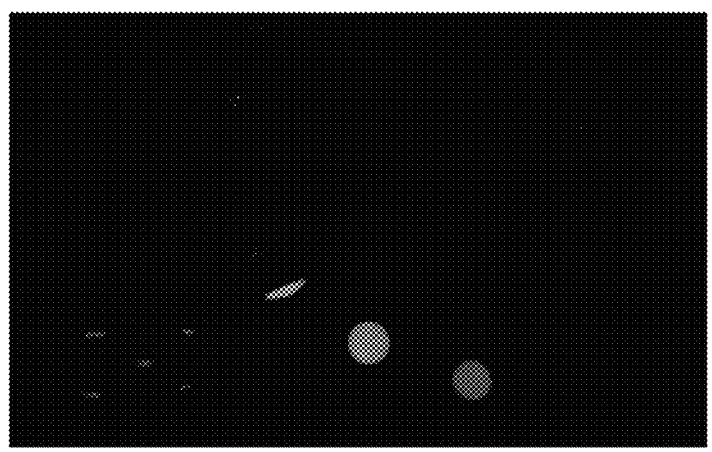

FIGS. 8A, 8B, and 8C show how target regions are typically extracted from actual captured images. FIG. 8A at the top shows an image captured of the target space under common conditions. Although there exist a plurality of light-emitting markers in the target space, they are not clearly distinguished from diverse objects in the room in such an ordinarily captured image.

FIG. 8B in the middle shows an image captured of the same target space with a reduced exposure. Reducing the exposure accentuates the difference in luminance between the objects emitting light and the objects giving no light emission. As a result, light-emitting marker images 110a, 110b, 110c, and 110d are distinguished from the rest. The imaging device 12 may capture images by adjusting the imaging conditions in this manner. However, under the adjusted conditions, an image of luminescent objects other than the light-emitting markers, such as a ceiling light fixture image 112, may appear with similar luminance.

FIG. 8C at the bottom shows a score map prepared as described above from the captured image of FIG. 8B, for example. The higher the score value in the score map, the higher the luminance it represents. As can be seen in FIG. 8C, the objects not emitting light and the objects emitting light in a color other than the target color such as the ceiling light fixtures have low score values and are thus excluded from the target objects. That is, regardless of the intensity levels of the RGB components, the differences between apparent colors are reflected in the score map using hues. This prevents erroneous detection of lighting fixtures, for example, and provides the same kind of recognition as by the human eye.

Using the saturation of the cone in the HSV color space permits accurate extraction of an image of the object of which the color has high purity and which is emitting light at high intensity. The likelihood L of how likely the object is emitting light may be determined by using saturation or by resorting to parameters representing light intensity or energy such as luminance. In this case, the same score calculation formulas as discussed above may be used.

Explained below is the operation of the information processing device 10 practiced by use of the above-described configuration. FIG. 9 is a flowchart showing steps in which the position information acquiring section 64 of the information processing device 10 acquires the position information about the light-emitting device 18. Execution of the flowchart is started typically when the information processing device 10 starts to process information when operated by the user 4, with the imaging device 12 starting concurrently to capture the target space including the light-emitting device 18.

The score map preparing section 70 first reads from the data storing section 62 the frame data of the video being captured by the imaging device 12 (S10). After performing initial procedures such as generating an RGB image as needed, the score map preparing section 70 prepares a score map associated with the current frame image (S12). Specifically, the score map preparing section 70 calculates the hue H and saturation S of each pixel based on its RGB value. The score map preparing section 70 then calculates the certainty C(H) of how likely the object originating the image has the target color and the likelihood L(H) of how likely the object is emitting light. The score map preparing section 70 proceeds to calculate the score value S of each pixel by substituting relevant values in a definitional equation of the score value S, such as by calculating the product of the two kinds of probability above. The score map preparing section 70 associates the obtained score values S with an array of pixels on the image plane.

Next, the target region extracting section 72 scans the score map to extract therefrom regions each formed of an aggregate of continuous pixels having high score values (S14). The target region extracting section 72 proceeds to acquire the position coordinates of the center of gravity and the size of each extracted region on the image plane (S16). The target region extracting section 72 selects only the regions whose sizes fall within a predetermined range, thereby excluding the regions with a low probability of being a light-emitting marker image (S18). If there are a plurality of light-emitting markers having different luminescent colors, steps S12 to S18 above are repeated for each of the colors involved.

Then the position information generating section 74, using the position coordinates of the center of gravity and the size of the extracted region, obtains the distance relative to the imaging plane of the light-emitting device 18 represented by the image of the region, prepares position information in a suitable form such as a depth map, and outputs the prepared position information to the data storing section 62 (S20). If a plurality of light-emitting markers are arrayed on the surface of the light-emitting device 18, the position information generating section 74 may acquire the position information about the light-emitting device 18 by integrating the position information about these light-emitting markers. If the light-emitting device 18 has a motion sensor inside, the position information generating section 74 may acquire the measurements taken by the sensor through the above-mentioned communication mechanism and integrate the obtained information to find a detailed position and posture of the light-emitting device 18.

Unless the processing needs to be terminated by the user 4's operation, for example, the frame data of the video being captured by the imaging device 12 is acquired successively, and the processing is repeated likewise (N in S22, followed by S10 to S20). This keeps the position information about the light-emitting device 18 being output at a predetermined rate. The information processing section 66 reads the position information and performs appropriate processing on the information in collaboration with the output data generating section 68. This causes the display device 16 to output the images and sounds reflecting the position and the movement of the light-emitting device 18. When it is necessary to terminate the information processing, the process of generating the position information is also terminated (Y in S22).

(2) Regulating the Drive Current of the Light-emitting Marker

As discussed above, stabilizing the accuracy of the process during capture to extract the pixels constituting the light-emitting marker image from the captured image in accordance with the pixel values is predicated on the light-emitting marker normally emitting light and on the imaging device suitably detecting the emitted light. For example, when the likelihood L of how likely the object originating the image is emitting light is determined by use of saturation S as described above, excessively high emission intensity of the light-emitting marker lowers the saturation S and thereby reduces the likelihood L. Furthermore, excessive emission intensity is likely to incur an achromatic color image, making it difficult to distinguish the color (hue). As a result, even if the light-emitting marker is emitting light in the predetermined color, the image of the marker may fail to be extracted accurately or its color may be confused with some other color.

Figure 10:
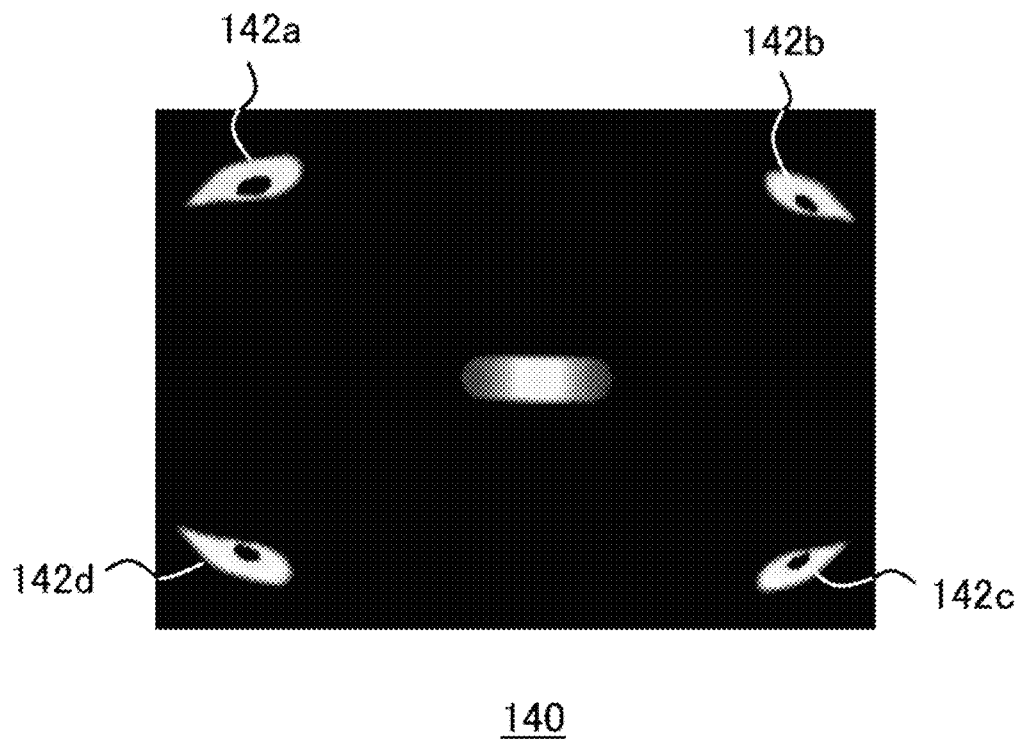
FIG. 10 is a schematic view showing how images of light-emitting markers are typically extracted from a captured image with the embodiment when the emission intensity of the markers is not appropriate.

FIG. 10 shows how images of light-emitting markers are typically extracted from the captured image when the emission intensity of the markers is not appropriate. Shown here is a score map 140 captured of a light-emitting device having five light-emitting markers. In the score map 140, the higher the score value of a given marker, the higher the luminance with which that marker is represented. Of the regions indicative of the light-emitting marker images with supposedly high score values, four regions 142*a*, 142*b*, 142*c* and 142*d* in the four corners include portions of low score values.

Typically, the low-score-value portions are incurred by reduced saturation or by the phenomenon of shining in white and thereby deprived of the original luminescent color to be detected. If the score map 140 is used to extract regions, there will be missing portions in the regions giving a moth-eaten appearance. Such omissions may appear not only in the extracted regions as illustrated but also in the image contour. In addition to when the emission intensity of the light-emitting marker itself is excessively high, the phenomenon of missing portions can take place when the light-emitting marker comes close to the imaging plane of the camera. Whether the phenomenon can occur is also dependent on the shape of the light-emitting marker.

If a region with such a partial omission is extracted, the calculated position of the center of gravity of the region deviates from the correct center of gravity in the image of the light-emitting marker. This leads to a decrease in the accuracy of acquiring the position of the light-emitting marker. When the light-emitting device is rotated or when the light-emitting marker is hidden behind another object, the calculated center of gravity of the marker image abruptly varies depending on the displacement of the missing portion or on whether the missing portion is completely hidden. This can lead to obtaining such position information as to indicate that the light-emitting marker appears to be moving discontinuously. Furthermore, the missing portion may disappear or change its shape suddenly because the hue may happen to fall in the acceptable range due to noise in the captured image, for example. This can also destabilize the position of the center of gravity in the image.

Meanwhile, an insufficient emission intensity level may result in the hue of the light-emitting marker image being changed under the influence of the external circumstances such as the color of the indoor illumination. Also, the farther the light-emitting marker is positioned from the imaging device 12, the lower the image luminance, and the more likely the marker is confused with a light-emitting indicator of another device when recognized. For these reasons, it is preferred that the emission intensity of the light-emitting marker be optimized so that the color of the pixels making up the marker image will fall in the acceptable range over the entire movable range of the marker in the real space.

With this embodiment, preparatory to the operation of the information processing system 1, the drive current of the light-emitting element in the light-emitting marker is regulated to a value suitable for image extraction. The drive current is regulated for each of the light-emitting markers involved. This resolves the problem of the accuracy of position information acquisition varying from product to product, the problem being attributed to variations in emission intensity due to individual differences such as the cover material of each light-emitting device or the accuracy of attaching each light-emitting device.

Figure 11:
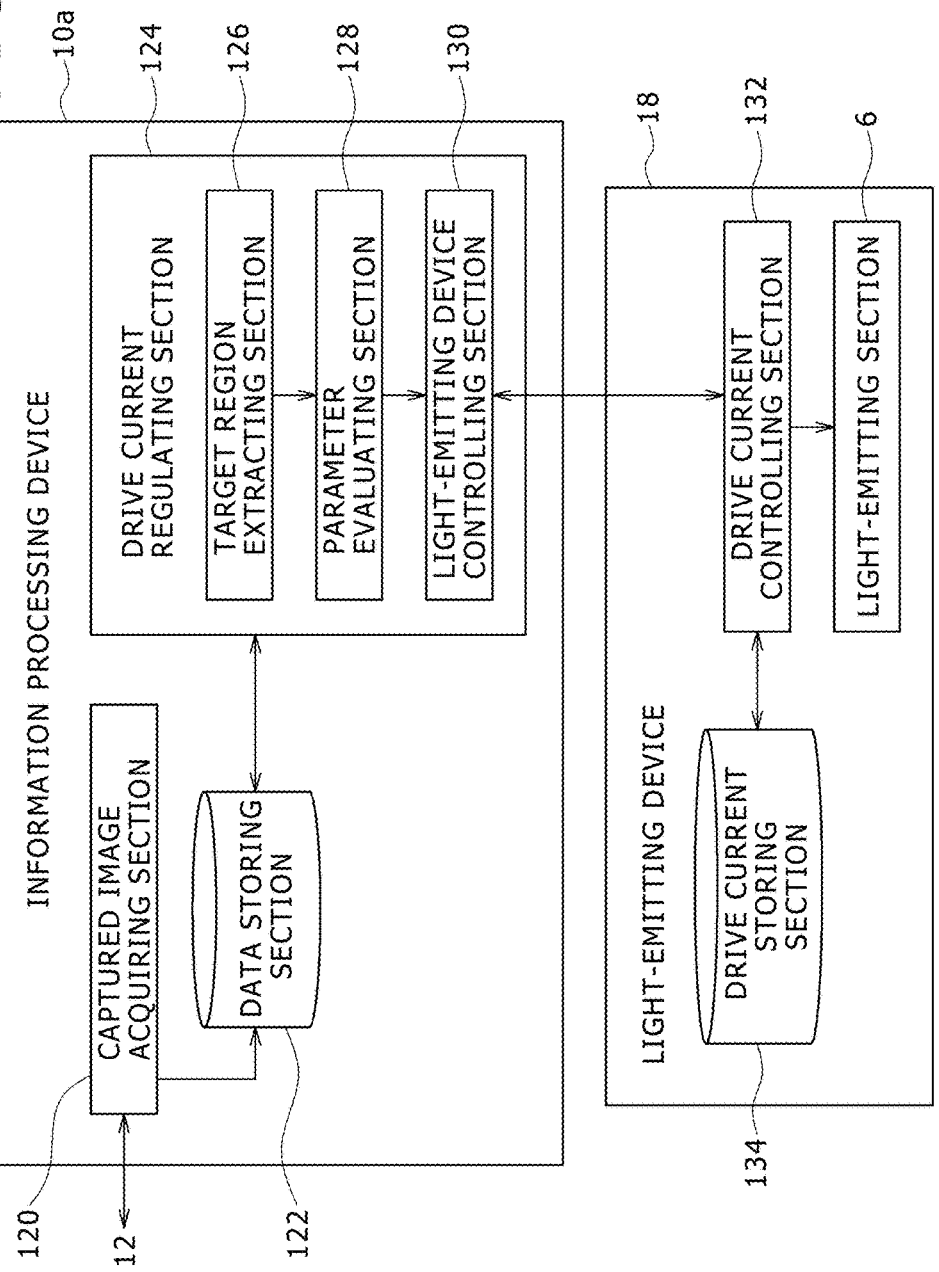
FIG. 11 is a block diagram showing a functional block configuration of the information processing device and light-emitting device in the embodiment.

FIG. 11 shows a functional block configuration of an information processing device 10*a* and a light-emitting device 18 in the embodiment. In this configuration, the information processing device 10*a* may be the same as the information processing device 10 used by the user 4 during the operation of the information processing system 1 as explained above with reference to FIG. 1. Alternatively, the information processing device 10*a* may be one prepared for the purpose of regulating the drive current before the light-emitting device 18 is shipped as a product. Where the information processing device 10*a* is the same as the information processing device 10, the functional blocks shown in FIG. 4 may also be provided. In the setup of FIG. 11, the blocks not directly related to the present embodiment are not shown. In any case, the internal circuit configuration of the information processing device 10*a* may be the same as that shown in FIG. 3.

The imaging device 12 and the light-emitting device 18 in FIG. 11 may be the same as the imaging device 12 and the light-emitting device 18 explained above with reference to FIG. 1. It should be noted that in this embodiment, the information processing device 10*a* and the light-emitting device 18 have mechanisms capable of establishing communication therebetween in wired or wireless fashion. After the information processing device 10*a* has regulated the drive current, the mechanisms allow the information processing device 10*a* to notify the light-emitting device 18 of the result of the regulation or to query the light-emitting device 18 to obtain the drive current settings held therein.

A captured image acquiring section 120 in the information processing device 10*a* acquires the data of the image captured of the light-emitting device 18 by the imaging device 12. If the imaging device 12 captures a video, the captured image acquiring section 120 may acquire only the frame data at the necessary timing. The data acquired by the captured image acquiring section 120 is stored into a data storing section 122.

A drive current regulating section 124 reads the captured image data from the data storing section 122 to extract therefrom an image of the light-emitting device 18, before regulating the drive current of the light-emitting device 18 to obtain a good image complying with predetermined criteria. The drive current regulating section 124 includes a target region extracting section 126, a parameter evaluating section 128, and a light-emitting device controlling section 130. The target region extracting section 126 extracts from the captured image a region presumed to be an image of the light-emitting marker. At this point, the same technique as in the operational phase of the system is used to extract the region. This allows the drive current suitable for region extraction to be obtained.

That is, where the image of the light-emitting marker is extracted at the time of operation on the basis of the score values S as discussed above, the same procedure for region extraction is carried out during regulation of the drive current. Still, this technique for extracting regions is not limitative of this embodiment. Alternatively, it is acceptable, for example, to extract a region whose hue falls in a predetermined range corresponding to the luminescent color of the light-emitting device 18, the region further presenting a predetermined parameter indicative of emission intensity such as saturation or luminance being equal to or higher than a predetermined value.

The parameter evaluating section 128 evaluates the predetermined parameter regarding the extracted region to determine whether the drive current needs to be changed. Specific criteria for the determination vary depending on the parameter and on the direction in which the drive current is regulated. In theory, the drive current is regulated until the pixels making up the light-emitting marker image have all been extracted without omission. For example, with the drive current gradually reduced from its excessive state, the parameter indicative of whether the image of the extracted region is in a saturated state is being verified.

Specifically, the saturated state in this context is a state in which the hue of the pixel emitting light of the highest intensity among the pixels included in or circumscribed by the extracted region is out of the hue range associated with the original luminescent color. The drive current is gradually reduced until the saturated state is exited. In this manner, the marker is allowed to emit light at the highest intensity while the above-mentioned state of shining in white is being suppressed.

In light of the above-mentioned determination criteria, the parameter evaluating section 128 determines whether the drive current needs to be further regulated. Where the regulation is started from the above-mentioned excessive state of the drive current, the light-emitting device 18 at the time of regulation is positioned as close to the imaging device 12 as possible in the presumed movable range. This guarantees the accuracy of device position acquisition for the entire movable range. If it is determined that the drive current needs to be regulated, the light-emitting device controlling section 130 requests the light-emitting device 18 to regulate the drive current. When the regulation has been completed and an appropriate drive current is obtained, the light-emitting device controlling section 130 notifies the light-emitting device 18 to that effect.

The light-emitting device 18 includes a drive current controlling section 132 and a drive current storing section 134 in addition to the light-emitting section 6 shown in FIG. 2. In accordance with requests and notifications from the light-emitting device controlling section 130, the drive current controlling section 132 controls the drive current of the light-emitting element incorporated in the light-emitting section 6. The circuit configuration and the procedure for drive current control may be derived from common techniques and thus will not be discussed further. The drive current storing section 134 stores the suitable drive current value acquired through regulation. This enables the light-emitting device 18 to hold inside the drive current value which is suitable for the device and which allows for the individual difference between devices.

Once the appropriate drive current value is established, the drive current controlling section 132 at the time of operation reads the value from the drive current storing section 134 to drive the light-emitting section 6. If repeat execution of the regulation has resulted in a suitable drive current different from the initial value, the drive current controlling section 132 updates accordingly the data held in the drive current storing section 134. The suitable drive current may be varied depending on the specifics of information processing performed during operation or in keeping with the imaging circumstances. In such cases, the drive current storing section 134 may store different suitable drive currents corresponding to different situations. The drive current controlling section 132 may then read the current value suitable for the ongoing situation in response to the request from the information processing device 10a.

Figure 12:
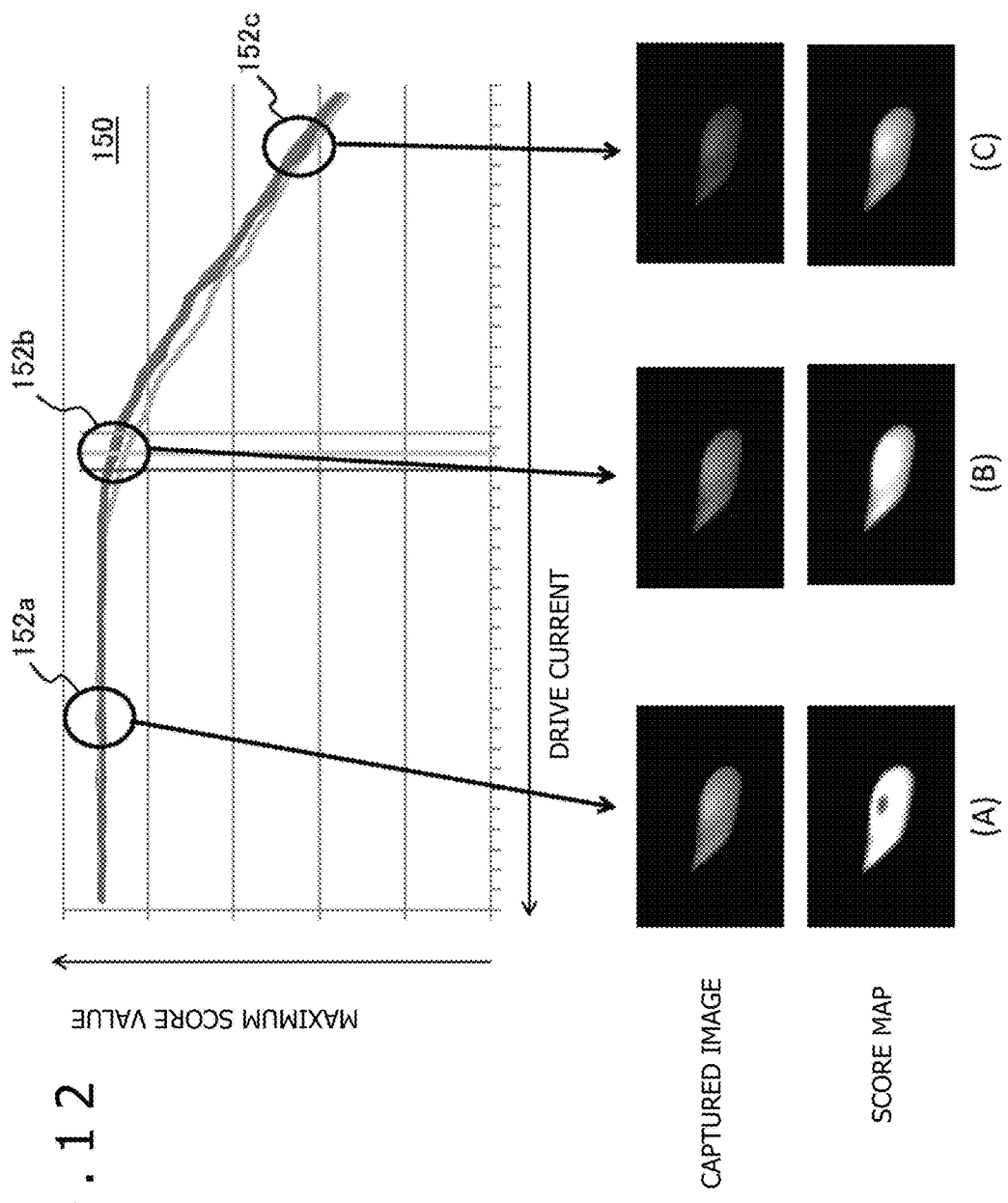
FIG. 12 is a schematic view explaining a procedure for regulating a drive current with the embodiment using score values.

FIG. 12 is a schematic view explaining a procedure for regulating the drive current when the score values S are used. Shown here is an example in which the amount of change in the maximum score value of the extracted region with regard to a drop in the drive current is adopted as the parameter for drive current regulation. A graphic representation 150 at the top of FIG. 12 plots variations of the maximum score value with regard to the drive current. The farther to the left along the horizontal axis representing the drive current, the larger the drive current. The subfigures at the bottom of FIG. 12 show captured images of the light-emitting marker and score maps acquired therefrom when the light-emitting marker is driven using a plurality of drive currents.

In a state 152a where the drive current is excessive, the portion emitting high-intensity light may be out of the stipulated hue range as described above. This incurs a missing portion in the region to be extracted, as shown in the score map (A). As a result, the position of the center of gravity is incorrect and the accuracy of acquiring the position of the light-emitting device 18 is lowered. On the other hand, in a state 152c where the drive current is too small, the entire captured image appears dimmed as shown in the score map (C). This leads to low score values as a whole. The operation in this state is likely to result in inappropriate extraction of the region and raises the possibility of confusing another light-emitting object with the light-emitting device 18, especially when the light-emitting device 18 is positioned away from the imaging device 12.

In a state 152b where the drive current is appropriate, the image of the extracted region appears with no omission and at intensity high enough to make clear distinction from the surroundings, as indicated in the score map (B). As is evident from the graphic representation 150, when the drive current is excessive, the maximum score value remains more or less unchanged in response to a dropping drive current. The reason for this is that even if the missing portion has been reduced in keeping with the dropping drive current, so that the position of the pixel indicative of the highest score value has been changed correspondingly, the score value itself remains saturated at its maximum. A suitable drive current for resolving the saturated state is then obtained. This provides a maximum drive current of which the score map is shown in (B).

Specifically, the drive current is gradually reduced from its saturated state. With the maximum score value starting to drop, it is determined whether the amount of change in the maximum score value with regard to a predetermined amount of drop in the drive current has become equal to or larger than a predetermined value. If the amount of change in the maximum score value is found equal to or larger than the predetermined value, then the criteria are determined to be met. That is, this determination technique involves finding the point in time at which the region extracted as the light-emission marker image exits from the saturated state by use of the amount of change in the maximum score value. Instead of the amount of such change, a primary or secondary derivative graph may be used alternatively.

The determination criteria and the parameters for use therein are not limited to those described above. Alternatively, the determination may be performed by verifying likewise the amount of change in maximum saturation or in maximum luminance represented by the extracted region with regard to the drive current. As another alternative, it may be determined whether the number of pixels in the extracted region has come to be constant regarding the change in the drive current. As a further alternative, score maps may be obtained with a plurality of drive currents as shown in FIG. 12, and the obtained score maps may be compared with one another for various image analyses so that an optimal drive current may be acquired by interpolation.

Figure 13:
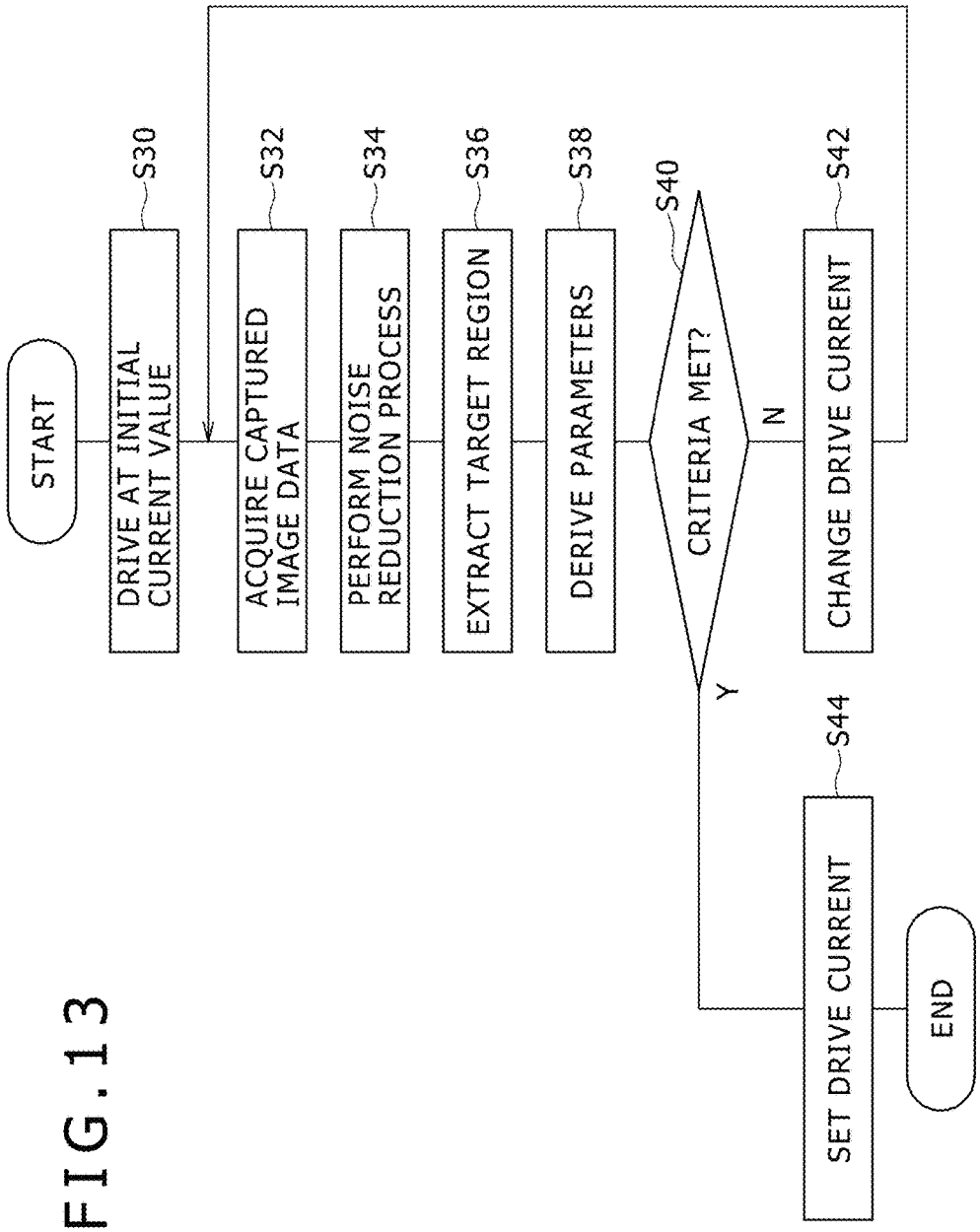
FIG. 13 is a flowchart showing steps of regulating the drive current with the information processing device and light-emitting device in the embodiment.

Described below are the operations of the information processing device and the light-emitting device that may be practiced in the above-described configuration. FIG. 13 is a flowchart showing steps of regulating the drive current with the information processing device 10a and light-emitting device 18. Execution of the flowchart is started typically when the information processing device 10a is requested by the user 4 to meet the need for regulating the drive current. At this point, the light-emitting device controlling section 130 controls the light-emitting device 18 to be driven with an initial current value predetermined for regulation purposes (S30).

In the above-mentioned example, a deliberately elevated current value for making the light-emitting marker image appear partially white is provided as the initial current value. The light-emitting device 18 is fixed in a suitable position in view of the direction in which the drive current is regulated, for example. If the user 4 is supposed to regulate the drive current in his or her home, the user 4 may be given instructions through display images to hold the light-emitting device 18 by hand and position it at a suitable distance from the imaging device 12. At the same time, the imaging device 12 starts to capture the light-emitting device 18.

Next, the captured image acquiring section 120 acquires the data of the image captured by the imaging device 12, and stores the acquired data into the data storing section 122 (S32). The target region extracting section 126 in the drive current regulating section 124 reads the image data from the data storing section 122 and performs a noise reduction process on the data using a common filter (S34). This provides a suitable drive current with more accuracy. If the captured image sent from the imaging device 12 is a raw image, that image may have to be converted to an RGB image or may need to be processed in some other way.

The target region extracting section 126 extracts from the captured image a region presumed to be the light-emitting marker image (S36). This step, as with steps S12 and S14 in FIG. 9, may be the process of obtaining the score values from hue and saturation to prepare a score map that in turn is searched for an aggregate of continuous pixels having high score values. However, the process is not limitative of this embodiment. Alternatively, a true-false determination may be performed to extract an aggregate of continuous pixels that have hues falling within a predetermined hue range associated with the luminescent color of the light-emitting marker, the continuous pixels further presenting the saturation or luminance being equal to or higher than a predetermined level.

The parameter evaluating section 128 then derives a predetermined parameter from the extracted region (S38) and determines whether the parameter meets the criteria involved (S40). With the technique explained above in reference to FIG. 12, the predetermined parameter is the amount of change in the maximum score value with regard to the variation of the drive current. Thus in a first flow of step execution where the light-emitting device 18 is driven with the initial current value, only the maximum score value is acquired. The determination against the criteria is performed in a second and subsequent flows. Since the initial current value obviously fails to meet the criteria (N in S40), the light-emitting device controlling section 130 requests the drive current controlling section 132 in the light-emitting device 18 to change the drive current. This causes the drive current of the light-emitting device 18 to be changed (S42).

For example, the drive current is reduced by a predetermined amount of change. The captured image acquiring section 120 again acquires the data of the captured image of the light-emitting device 18 driven by the changed drive current (S32). After the target region extracting section 126 has performed steps S34 and S36 as described above, the parameter evaluating section 128 obtains parameters (S38). With the above-mentioned technique, a comparison is made between the maximum score value at the initial current value and the maximum score value at the current value reduced by the predetermined amount of change, to find the difference therebetween. It is then determined whether the difference is at least equal to a predetermined value (S40). If the difference is determined to be lower than the predetermined value, then the saturated state shown in FIG. 12 is determined to be still present, and the drive current is again reduced by the predetermined amount of change (S42).

It should be noted that the direction in which the drive current is changed and the amount of change in the drive current may vary depending on the determination criteria in use. Steps S32 to S42 above are repeated until the criteria are met. When the criteria are met, e.g., when the amount of change in the maximum score value is equal to or larger than a predetermined value in the above example (Y in S40), the light-emitting device controlling section 130 notifies the light-emitting device 18 to that effect. In response, the drive current controlling section 132 in the light-emitting device 18 considers the drive current at that point to be appropriate and stores the current value into the drive current storing section 134 (S44). Thereafter, the light-emitting device 18 is driven with the appropriate drive current in the subsequent operation, so that the image of the light-emitting marker is accurately extracted.

In the above-described embodiment, the position and the movement of the target object are determined using the light-emitting marker emitting light in the predetermined color during the information processing that involves using the captured image as input information. In this case, a score map is used in detecting the image of the light-emitting marker from the captured image. The score map is prepared by acquiring a score value for each of the pixels constituting the captured image, the score value representing on an image plane the degree of how likely the pixel is one of the pixels making up the light-emitting marker image. The score value here is calculated by the calculation formulas that integrate the certainty of how likely the object represented by the image has the predetermined color and the likelihood of how likely the object is emitting light. When the score value is obtained from these two points of view, it is possible to reduce the possibility of erroneously detecting an object that has a color similar to that of the light-emitting marker but is not emitting light, or an object that is emitting light but has a different color.

Hue is used here to determine the certainty of how likely the object has the predetermined color. Where hue variations are subject to a finite acceptable range, it is possible to detect the object even if its hue varies due to changes in the imaging circumstances. The position information detected in this manner is thus obtained with high certainty. When the certainty is expressed as a function that varies continuously with hues, a pixel value error is prevented from getting amplified as a score value change. This prevents instability of the position of the center of gravity in the region detected as the light-emitting marker image and, by extension, instability of the position information of the light-emitting device 18, such instability being caused typically by the shape of the detected region varying significantly in frame size.

The saturation of the cone in the HSV color space is used to determine the likelihood of how likely the object is emitting light. This allows the difference between pixels in terms of emission intensity of pure RGB colors to be directly reflected on the score map. That in turn makes it possible to extract with high accuracy the image of the object emitting light in a specific color of high purity. The configuration above permits accurate extraction of the marker images each distinguished by its luminescent color. The position information about a plurality of light-emitting devices 18, even if their light-emitting markers are identical in shape, and the position information about a plurality of users 4 using the light-emitting devices 18, are acquired in a manner positionally distinguishing each device and each user. As a result, an increasing number of light-emitting devices 18 and of the users 4 using them can be dealt with easily. This is a significant advantage over existing position acquiring systems that typically utilize infrared rays instead of color information.

Furthermore, the drive current value is regulated to permit suitable extraction of the light-emitting marker image. Regulating the drive current is intended to prevent a drop in the accuracy of acquiring the position information. Such a drop in the accuracy of position information acquisition is typically attributed to the excessively high emission intensity varying the hue or saturation of an image and causing a portion thereof to be excluded from the target object to be extracted, or due to the inordinately low emission intensity preventing the light-emitting marker from getting detected or causing the light-emitting marker to be confused with some other object. The drive current is regulated so that the pixels emitting light of the highest intensity in the region to be extracted as the light-emitting marker image will fall within a predetermined hue range.

For example, the drive current is gradually reduced from its excessive state. During that time, changes in the largest of the score values of the region extracted as the light-emitting marker image are acquired. When the maximum score value indicates an exit from the saturated state, i.e., when the maximum score value starts to vary in a manner reflecting the change in the drive current, the current value at that point is identified as the appropriate drive current value. This enables the region of the light-emitting marker image to be extracted accurately. That in turn prevents the obtained position information from falsely representing the proper movement of the light-emitting marker and forestalls the instability of the position information.

While the present disclosure has been described in conjunction with a specific embodiment given as an example, it should be understood by those skilled in the art that the above-described composing elements and various processes may be combined in diverse ways and that such combinations, variations and modifications also fall within the scope of this disclosure.

The present disclosure contains subject matter related to that disclosed in Japanese Priority Patent Applications JP 2015-233669 and JP 2015-233670 filed in the Japan Patent Office on Nov. 30, 2015, the entire contents of which are hereby incorporated by reference.

What is claimed is:

1. An information processing device comprising:
    a captured image acquiring section that acquires data of an image captured of a target space including a light-emitting marker emitting light in a predetermined color;
    a score map preparing section that determines, for each of pixels making up the captured image, a score value indicative of the certainty of how likely a target object represented by an image including the pixel is emitting light in the predetermined color on the basis of a pixel value, the score map preparing section further preparing a score map associating the score values with an array of pixels on an image plane;
    a target region extracting section that extracts from the score map an aggregate of pixels meeting predetermined criteria as a region constituting an image of the light-emitting marker; and
    a position information generating section that, on the basis of the position of the extracted region, generates and outputs position information about the light-emitting marker in a real space.

2. The information processing device according to claim 1, wherein the score map preparing section determines the score value based on the product of the certainty of how likely the target object has the predetermined color and of the likelihood of how likely the target object is emitting light.

3. The information processing device according to claim 2, wherein the score map preparing section determines the certainty of how likely the target object has the predetermined color and the likelihood of how likely the target object is emitting light on the basis of, respectively, the hue and the saturation of the color presented by the pixel in a hue-saturation-value color space of a cone.

4. The information processing device according to claim 2, wherein the score map preparing section calculates the certainty of how likely the target object has the predetermined color by use of a predetermined continuously varying function that takes values larger than 0 in a finite range of hues including the hue of the predetermined color, the function taking the value of 0 outside of the finite range of hues.

5. The information processing device according to claim 2, wherein the score map preparing section calculates the certainty of how likely the target object has the predetermined color by use of a predetermined continuously varying function that takes a maximum value given the hue of the predetermined color.

6. The information processing device according to claim 3, wherein the score map preparing section determines the saturation as the likelihood of how likely the target object is emitting light.

7. The information processing device according to claim 1, wherein the score map preparing section prepares the score map for each of different luminescent colors in which a plurality of light-emitting markers emit light, and
the position information generating section generates the position information for each of the different luminescent colors.

8. The information processing device according to claim 1, wherein the target region extracting section excludes, from the regions constituting the images of the light-emitting markers, any of the extracted regions of which the size is outside of a predetermined range.

9. An information processing method, executed by an information processing device, comprising:
acquiring data of an image captured of a target space including a light-emitting marker emitting light in a predetermined color, before storing the acquired data into a memory;
determining, for each of pixels making up the captured image read from the memory, a score value indicative of the certainty of how likely a target object represented by an image including the pixel is emitting light in the predetermined color on the basis of a pixel value, before preparing a score map associating the score values with an array of pixels on an image plane;
extracting from the score map an aggregate of pixels meeting predetermined criteria as a region constituting an image of the light-emitting marker; and
on the basis of the position of the extracted region, generating and outputting position information about the light-emitting marker in a real space.

10. A light-emitting device regulating apparatus comprising:
a captured image acquiring section that acquires data of an image captured of a light-emitting device emitting light in a predetermined color;
a target region extracting section that extracts, from the captured image, a region presumed to be an image of a light-emitting section of the light-emitting device in accordance with predetermined criteria;
a parameter evaluating section that determines whether a parameter represented by the extracted region meets predetermined criteria; and a light-emitting device controlling section that varies a drive current of the light-emitting device until the parameter meets the predetermined criteria, the light-emitting device controlling section further setting for the light-emitting device the drive current obtained when the predetermined criteria are met.

11. The light-emitting device regulating apparatus according to claim 10, wherein the parameter evaluating section uses a parameter indicative of whether the image of the light-emitting device in the captured image is in a saturated state, the parameter evaluating section further determining that the predetermined criteria are met when the parameter indicates that the saturated state is exited as a result of a drop in the drive current.

12. The light-emitting device regulating apparatus according to claim 10, wherein the target region extracting section determines a score value indicating the certainty of how likely an object represented by an image including a given pixel is emitting light in the predetermined color on the basis of a pixel value, the target region extracting section further extracting an aggregate of pixels of which the score values meet predetermined criteria; and
the parameter evaluating section takes as the parameter the amount of change in the largest of the score values of the extracted pixel aggregate with regard to a drop in the drive current, the parameter evaluating section further determining that the predetermined criteria are met when the amount of change is equal to or larger than a predetermined value.

13. The light-emitting device regulating apparatus according to claim 12, wherein the target region extracting section determines the score value based on the product of the certainty of how likely the target object has the predetermined color and of the likelihood of how likely the target object is emitting light.

14. The light-emitting device regulating apparatus according to claim 13, wherein the target region extracting section determines the certainty of how likely the target object has the predetermined color and the likelihood of how likely the target object is emitting light on the basis of, respectively, the hue and the saturation of the color presented by the pixel in a hue-saturation-value color space of a cone.

15. The light-emitting device regulating apparatus according to claim 10, wherein the captured image acquiring section acquires the data of the image captured of the light-emitting device that includes a light-emitting element emitting light when driven by the drive current and a transparent cover material incorporating the light-emitting element.

* * * * *